US012706376B2

(12) United States Patent
Kim et al.

(10) Patent No.: US 12,706,376 B2

(45) Date of Patent: Aug. 11, 2026

(54) CLAMPING APPARATUS FOR ANTENNA DEVICE

(71) Applicant: KMW INC., Hwaseong-si (KR)

(72) Inventors: Duk Yong Kim, Yongin-si (KR); In Ho Kim, Yongin-si (KR); Dae Myung Park, Hwaseong-si (KR); Sang Hyo Kang, Hwaseong-si (KR); Kyo Sung Ji, Hwaseong-si (KR); Chi Back Ryu, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 51 days.

(21) Appl. No.: 18/540,925

(22) Filed: Dec. 15, 2023

(65) Prior Publication Data

US 2024/0120650 A1 Apr. 11, 2024

Related U.S. Application Data

(63) Continuation of application No. PCT/KR2022/008216, filed on Jun. 10, 2022.

(30) Foreign Application Priority Data

Jun. 17, 2021 (KR) ........................ 10-2021-0078757
Jun. 10, 2022 (KR) ........................ 10-2022-0070540

(51) Int. Cl.
*H01Q 3/04* (2006.01)
*H01Q 1/12* (2006.01)
*H01Q 1/24* (2006.01)

(52) U.S. Cl.
CPC ............. *H01Q 3/04* (2013.01); *H01Q 1/1228* (2013.01); *H01Q 1/246* (2013.01)

(58) Field of Classification Search
CPC ............ H01Q 1/08; H01Q 1/12; H01Q 1/246; H01Q 1/1228; H01Q 3/02; H01Q 3/04; H01Q 21/28
See application file for complete search history.

(56) References Cited

U.S. PATENT DOCUMENTS 5,533,304 A * 7/1996 Noble .................... H01Q 1/125
52/114
2016/0211576 A1* 7/2016 Vassilakis ............ H01Q 1/1228

FOREIGN PATENT DOCUMENTS

JP 2013-507806 A 3/2013
KR 10-2003-0009910 A 2/2003
(Continued)

OTHER PUBLICATIONS

International Search Report mailed Sep. 28, 2022 for International Application No. PCT/KR2022/008216 and its English translation.
(Continued)

*Primary Examiner* — Hoang V Nguyen

(57) ABSTRACT

The present invention relates to a clamping apparatus for an antenna device, and particularly, to a clamping apparatus including a rotation unit configured to rotate an antenna device in a horizontal direction, a tilting unit configured to rotate the antenna device in a vertical direction, and a connection arm configured to install at least one of the rotation unit and the tilting unit on a support pole so that the support pole is not positioned on a horizontal rotation path and a vertical rotation path of the antenna device, thereby reducing an installation space for an antenna device with respect to the support pole.

9 Claims, 13 Drawing Sheets

(56) References Cited

FOREIGN PATENT DOCUMENTS

| | | | | | |
|---|---|---|---|---|---|
| KR | 10-1063936 | B1 | | 9/2011 | |
| KR | 10-2012-0086307 | A | | 8/2012 | |
| KR | 10-2016-0071728 | A | | 6/2016 | |
| KR | 10-2095871 | B1 | | 4/2020 | |
| WO | WO-2020209569 | A1 | * | 10/2020 | ............... H01Q 1/12 |
| WO | WO-2021006521 | A1 | * | 1/2021 | .............. F16B 2/065 |

OTHER PUBLICATIONS

Non-final Office Action mailed on Dec. 10, 2024 from the Japanese Patent Office for Application No. 2023-577397.

* cited by examiner

[FIG. 1]
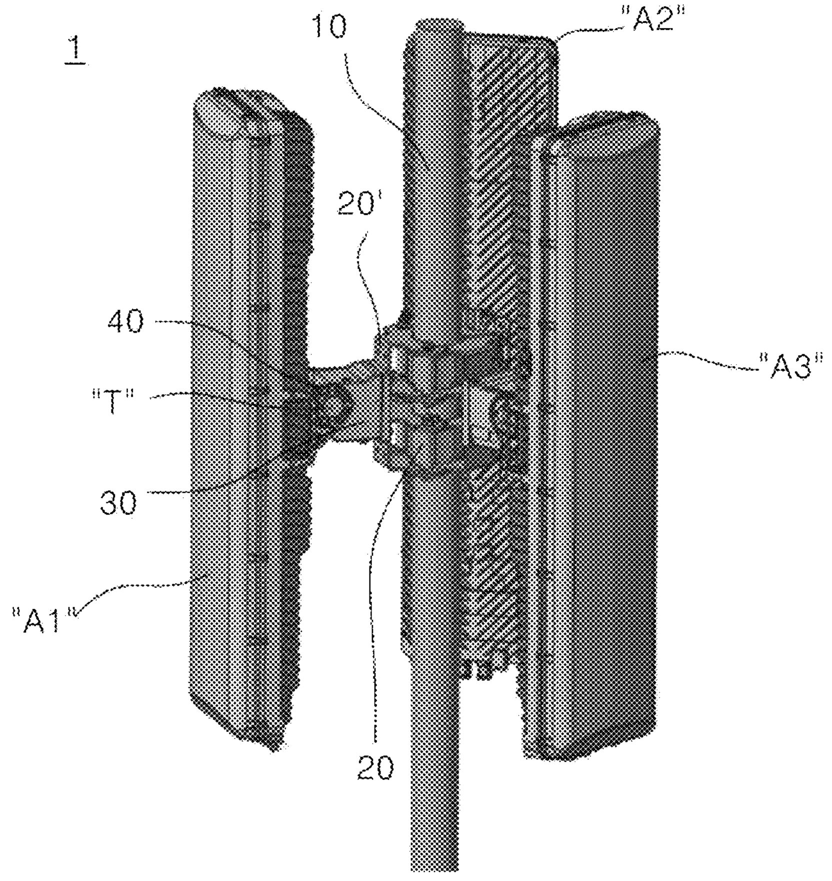

[FIG. 2]
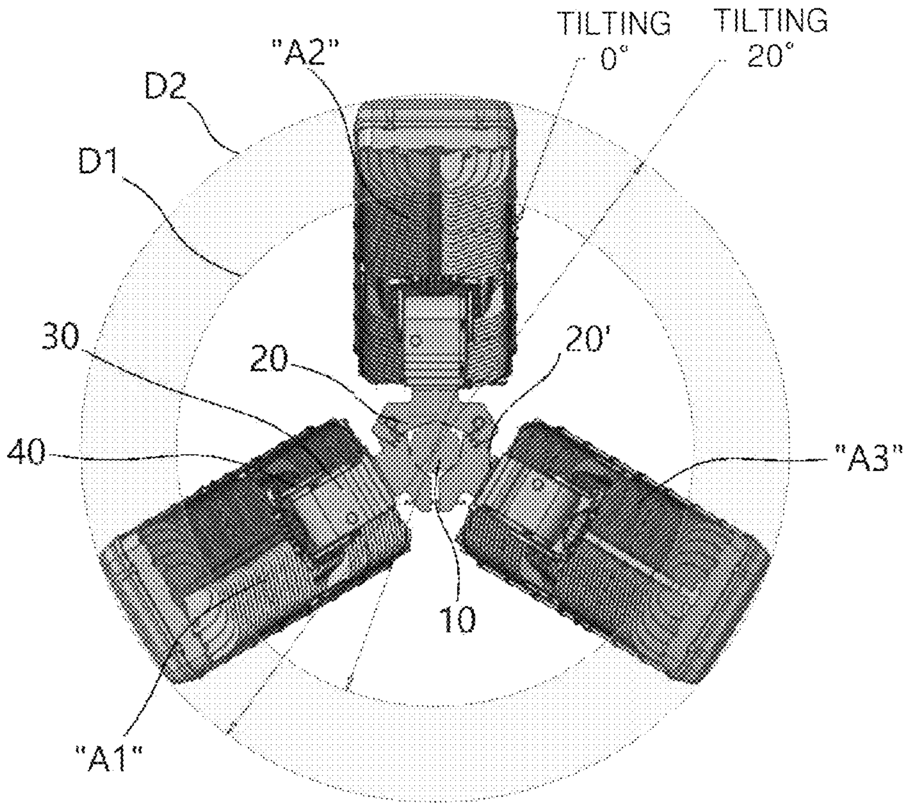

[FIG. 3]
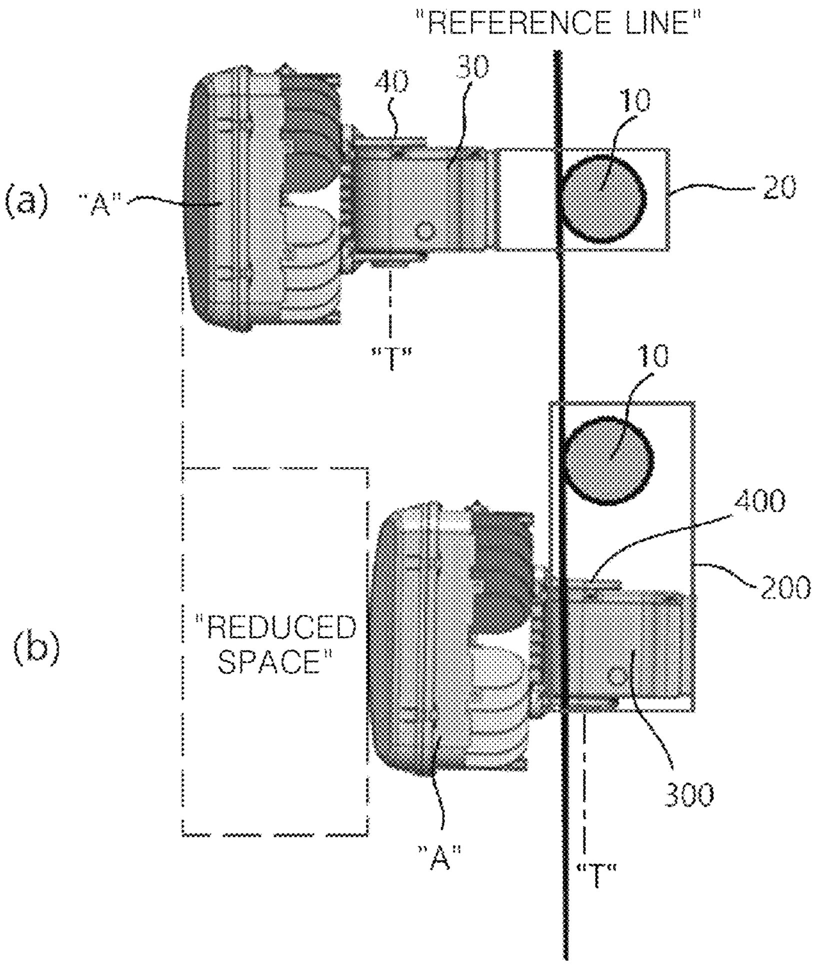

[FIG. 4]
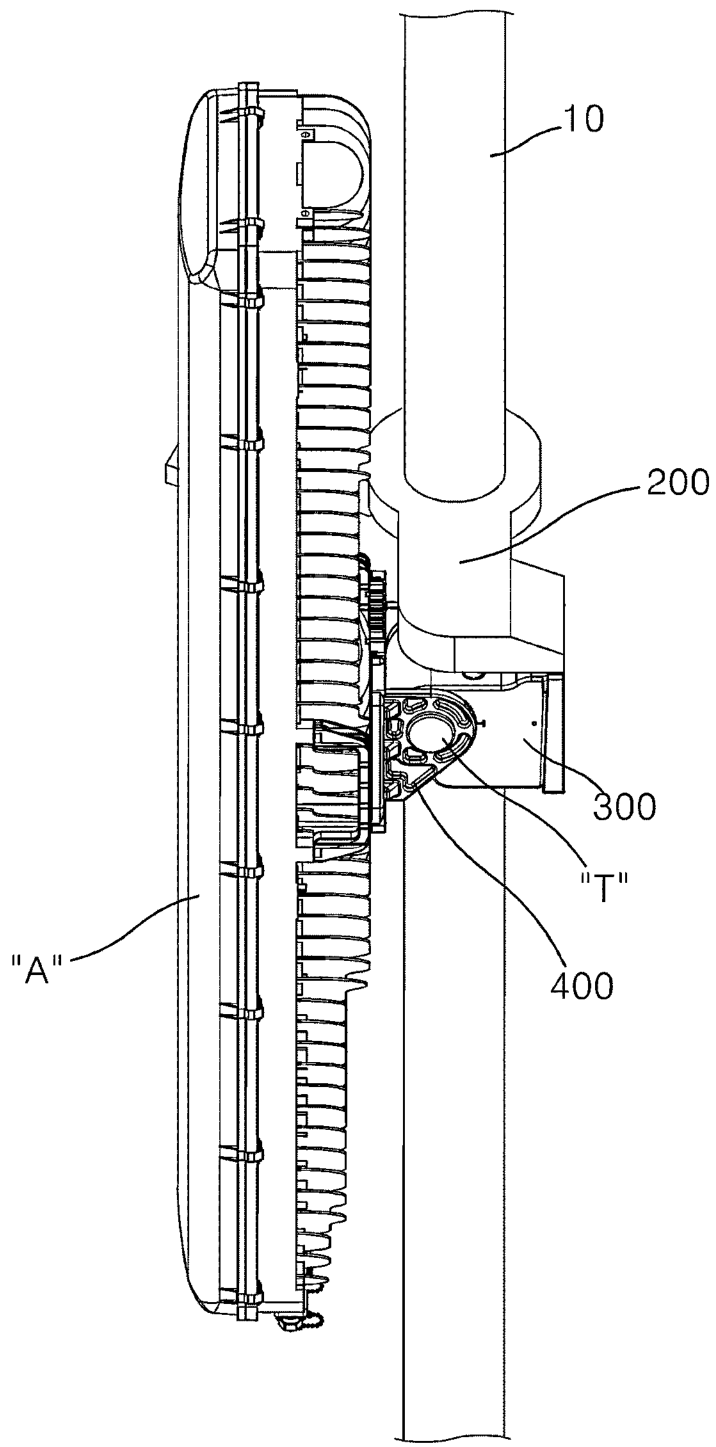

[FIG. 5]
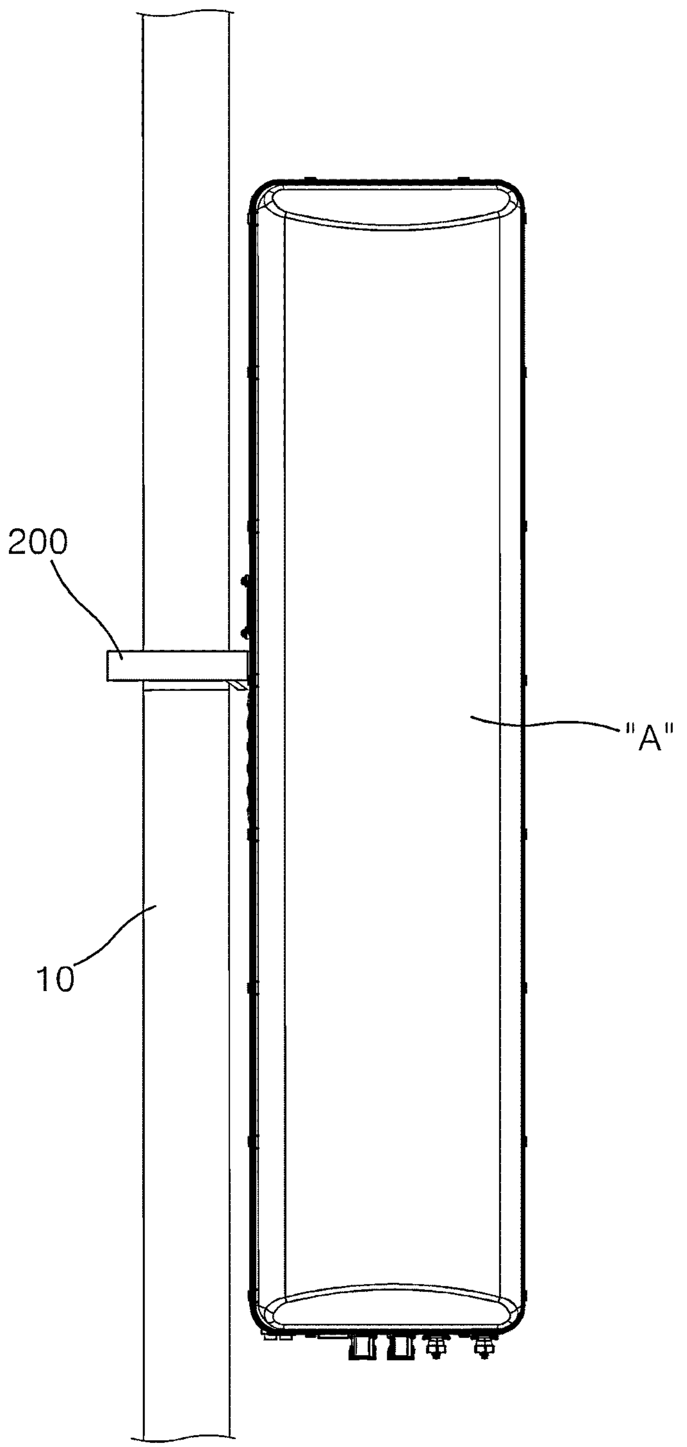

[FIG. 6]
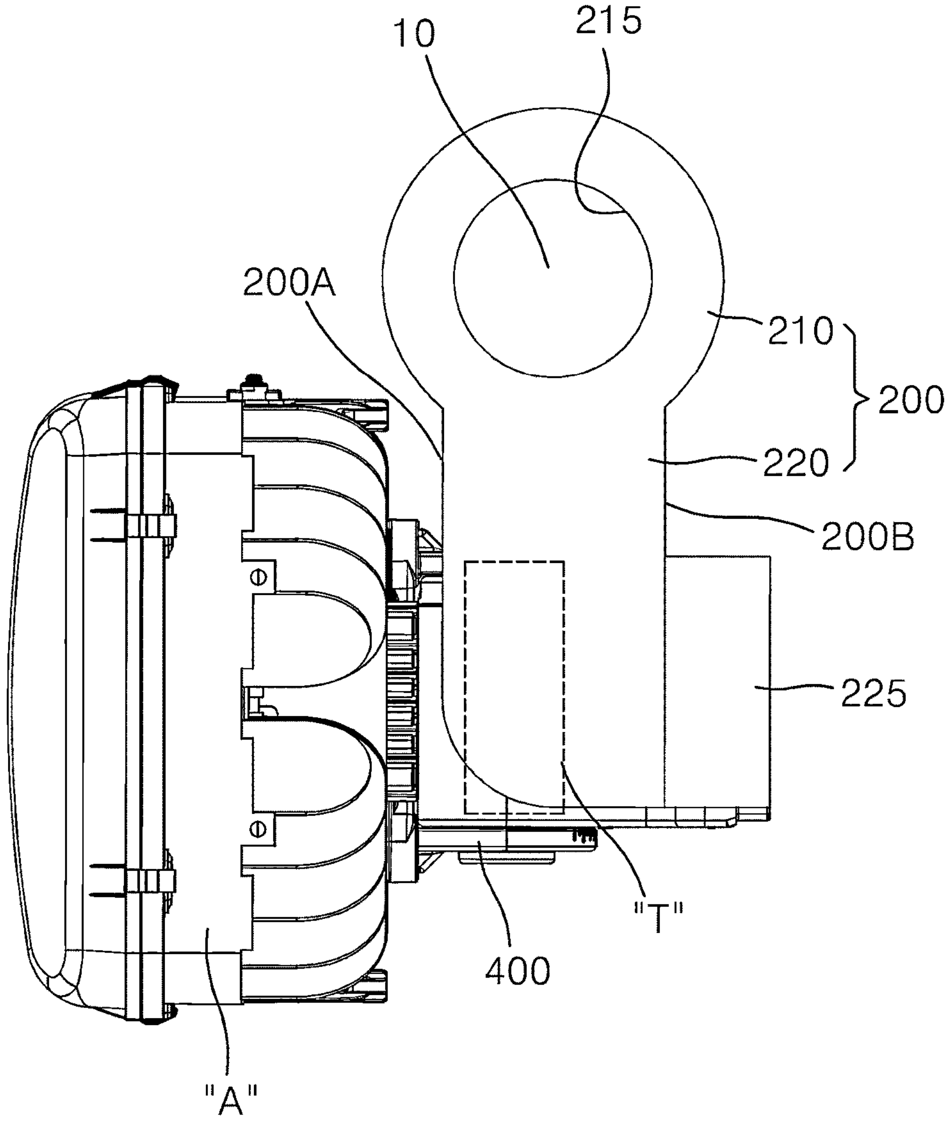

[FIG. 7]
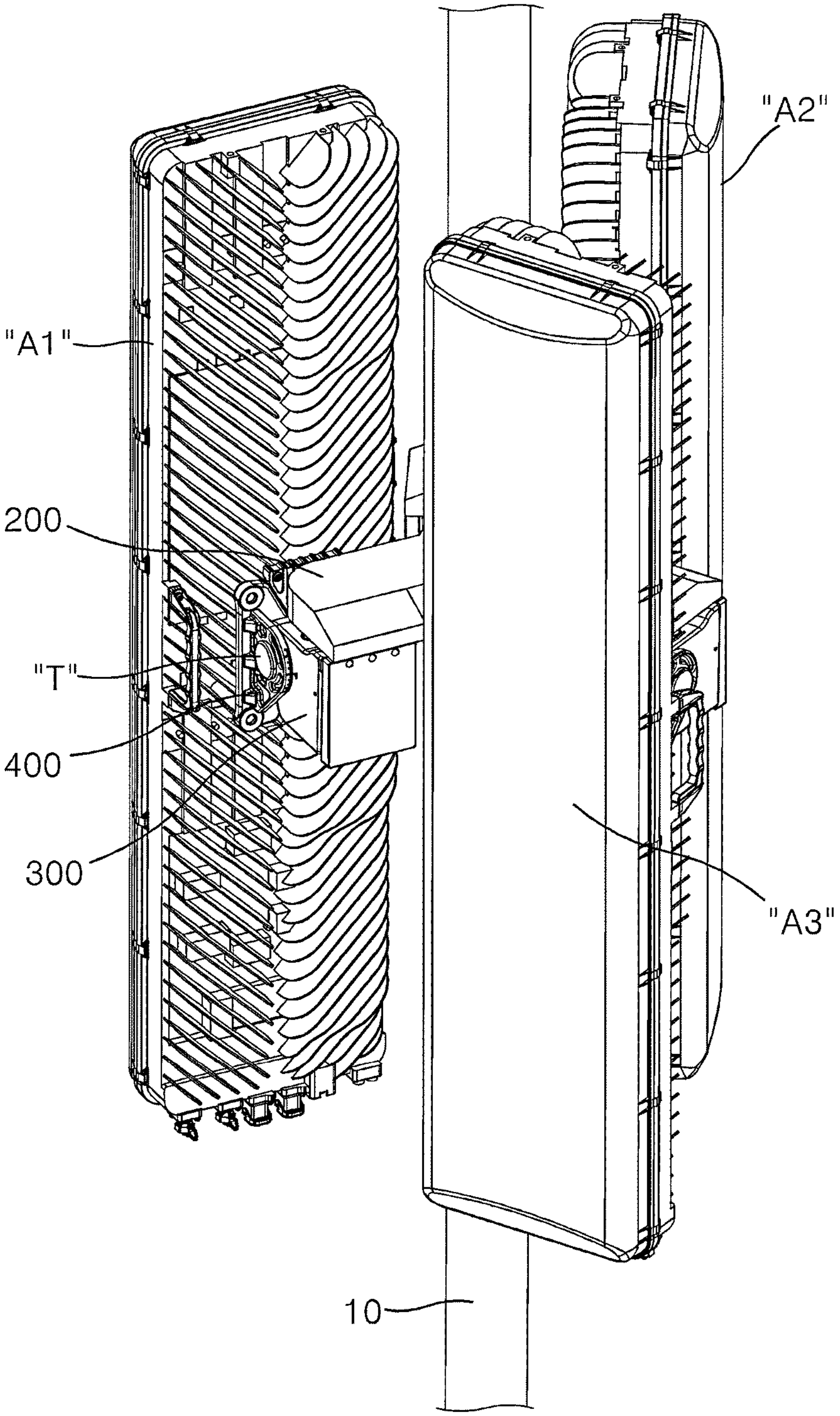

[FIG. 8]
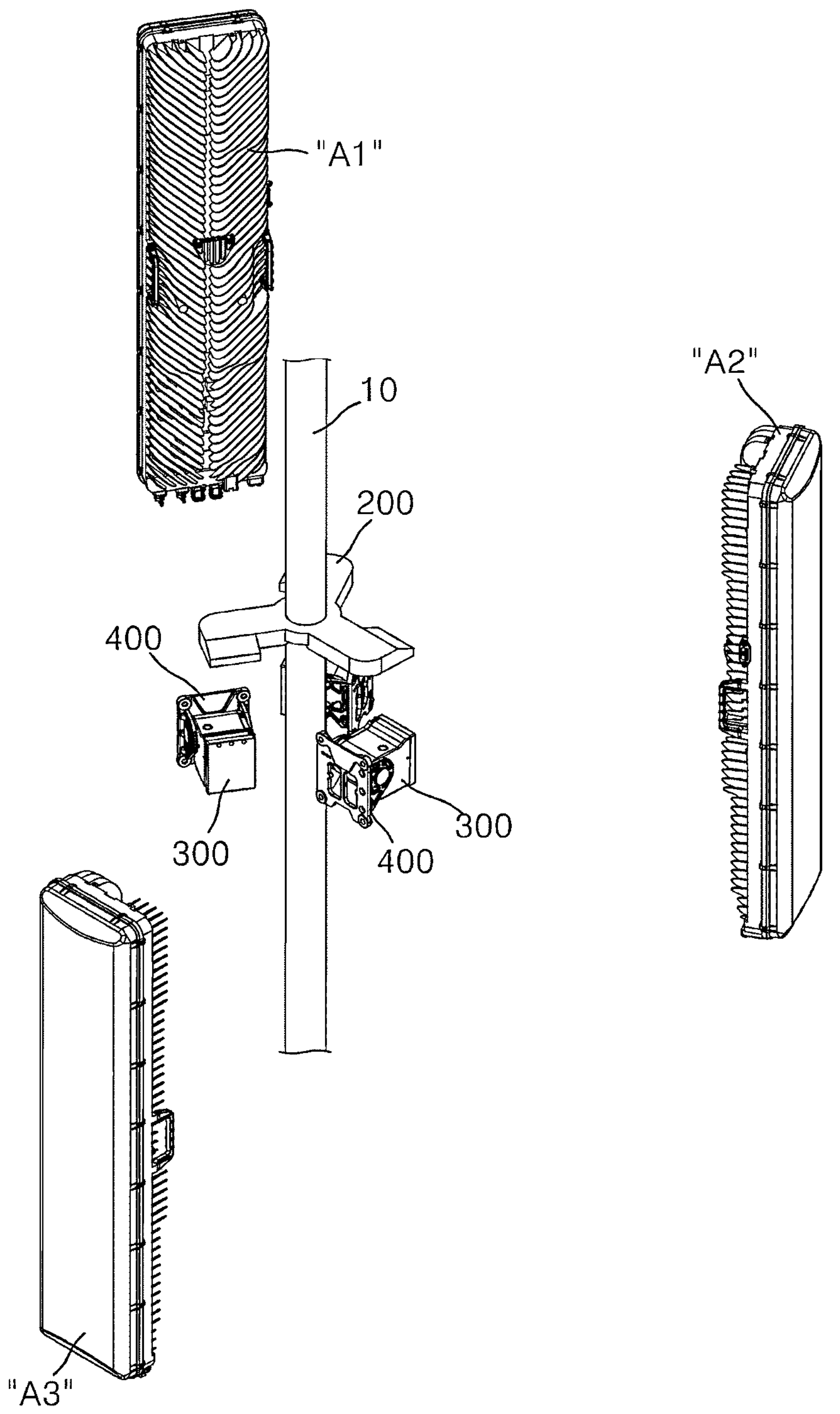

[FIG. 9]
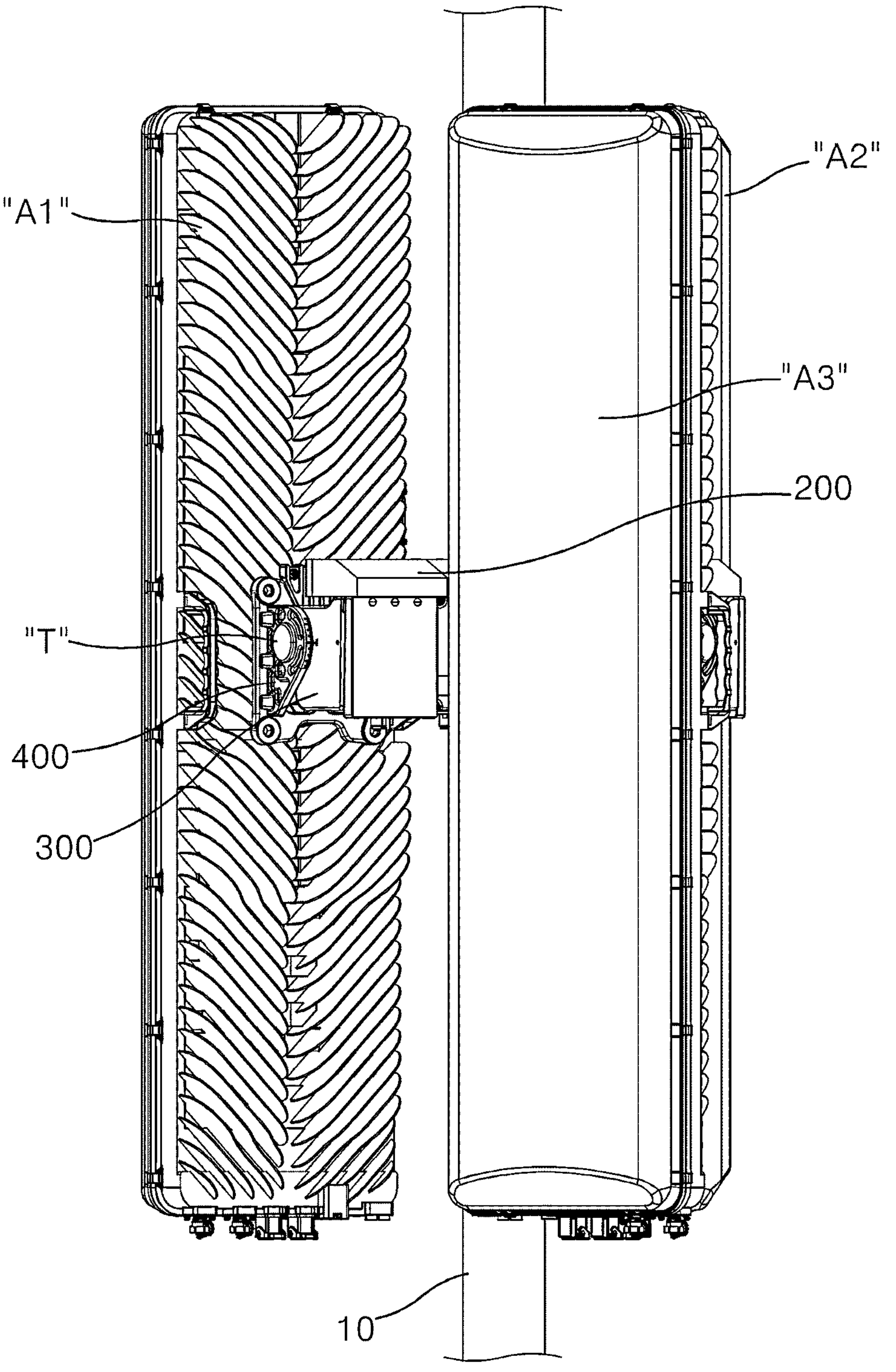

[FIG. 10]
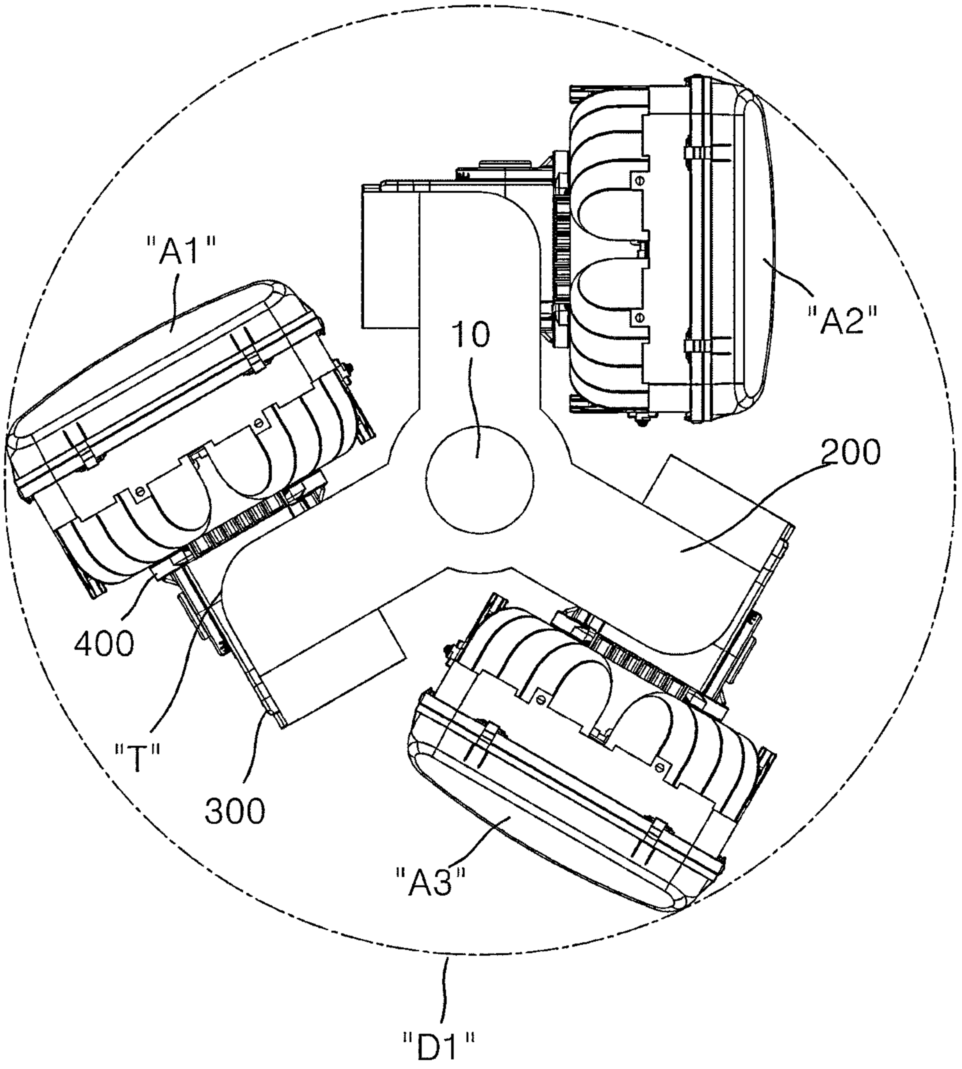

[FIG. 11]
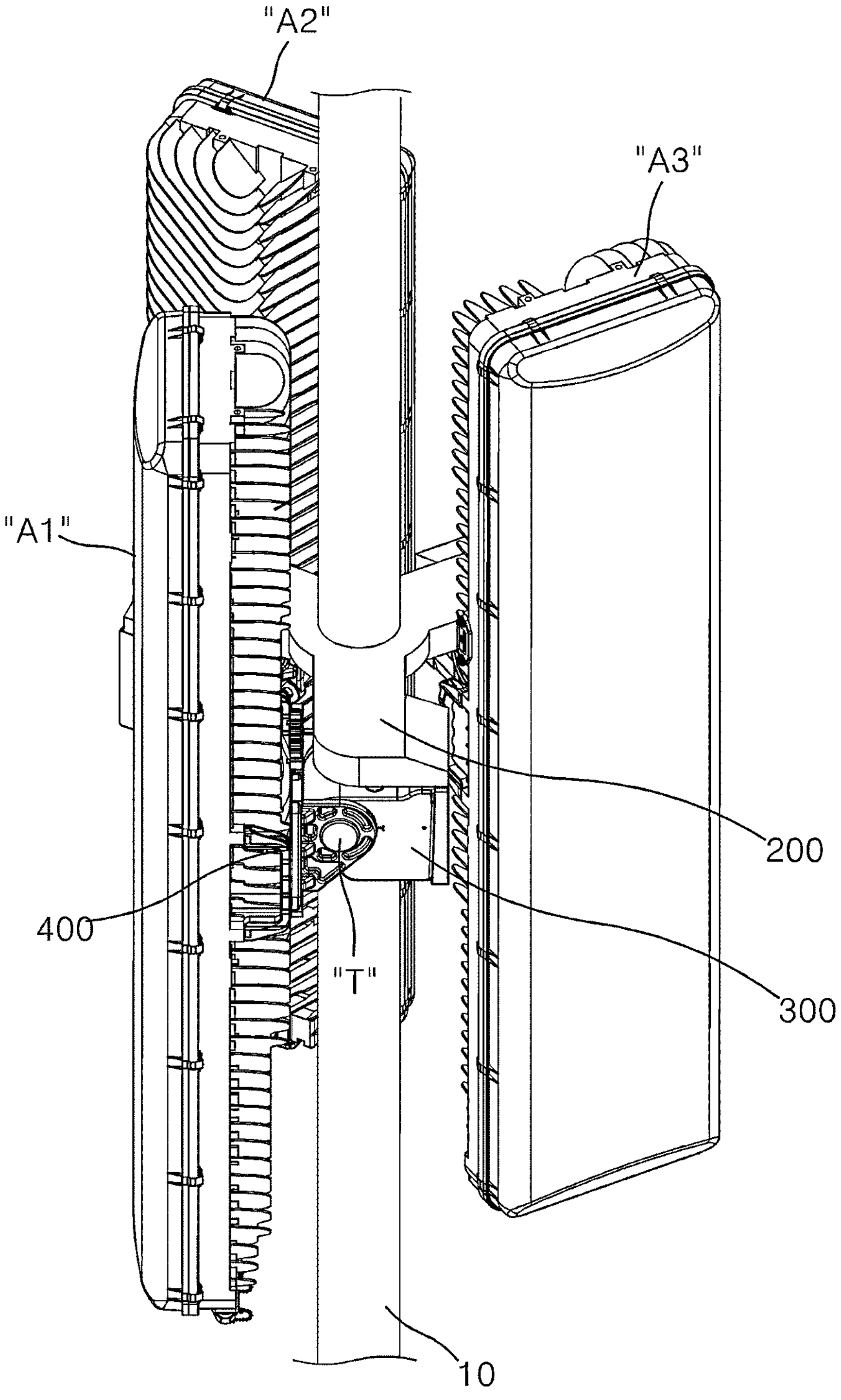

[FIG. 12]
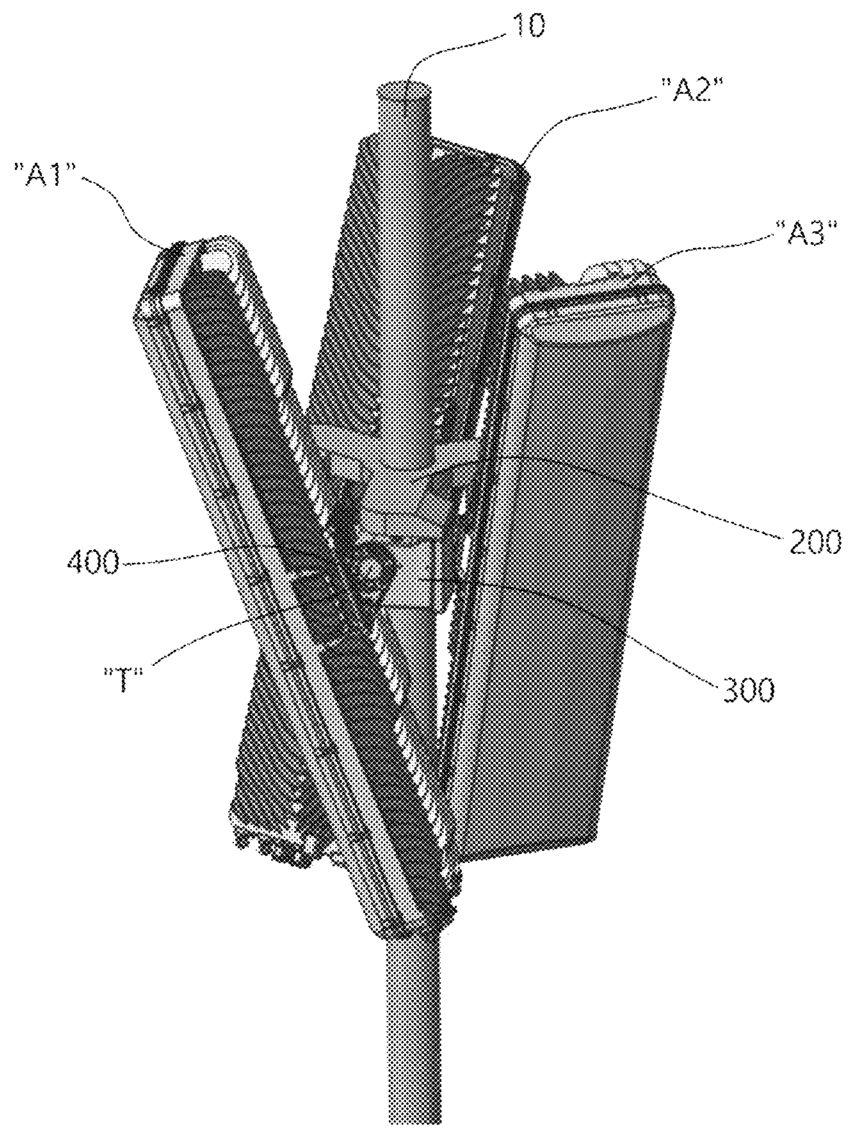

[FIG. 13]
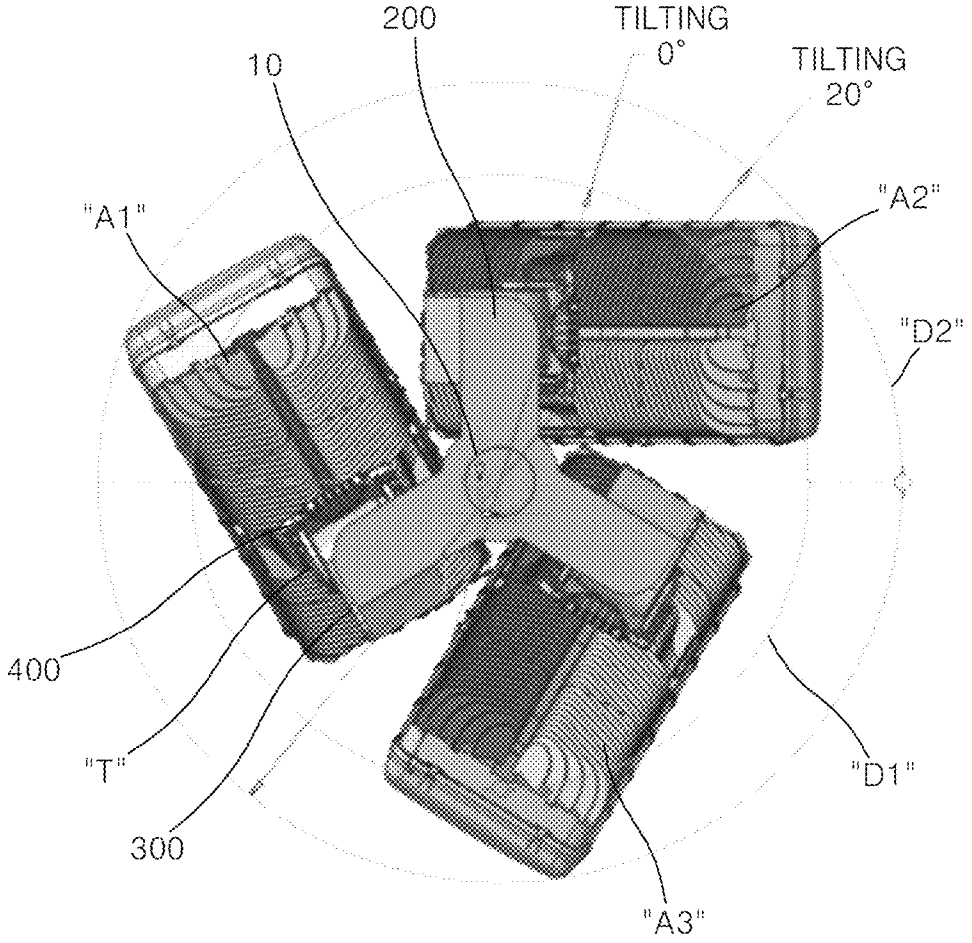

CLAMPING APPARATUS FOR ANTENNA DEVICE

CROSS-REFERENCE TO RELATED APPLICATIONS

This application is a continuation application of International Application No. PCT/KR2022/008216, filed Jun. 10, 2022, which claims the benefit of Korean Patent Application Nos. 10-2021-0078757, filed Jun. 17, 2021; and 10-2022-0070540, filed Jun. 10, 2022, in the Korean Intellectual Property Office, the disclosures of which are incorporated herein in their entirety by reference.

TECHNICAL FIELD

The present invention relates to a clamping apparatus for an antenna device, and more particularly, to a clamping apparatus for an antenna device, which is capable of reducing an installation space and costs and meeting various types of installation regulations in countries in which the clamping apparatus is installed.

BACKGROUND ART

In general, as an example of wireless communication technologies, a multiple-input/multiple-output (MIMO) technology refers to a technology for innovatively increasing data transmission capacity by using a plurality of antennas. This technology uses a spatial multiplexing technique, in which a transmitter transmits different data through the respective transmission antennas, and a receiver distinguishes the transmitted data by performing appropriate signal processing.

Therefore, it is possible to transmit a larger amount of data by increasing both the number of transmitting antennas and the number of receiving antennas and thus increasing channel capacities. For example, if the number of antennas increases to ten, the channel capacity of about times is ensured by using the same frequency band in comparison with the current single antenna system.

Eight antennas are used in 4G LTE-advanced, and a product equipped with 64 or 128 antennas has been developed in a current pre-5G step. It is expected that base station equipment having a much larger number of antennas will be used in 5G, which refers to a massive MIMO technology. The current cell management is 2-dimension, whereas 3D-beam forming is enabled when the massive MIMO technology is introduced, which also represents a full-dimension (FD) MIMO.

In the massive MIMO technology, the number of transmitters and the number of filters are increased as the number of antennas (ANTs) is increased. Nevertheless, because of cost of lease or spatial restriction in respect to an installation location, RF components (antennas, filters, power amplifiers, transceivers, etc.) need to be practically manufactured to be small in size, light in weight, and inexpensive, and the massive MIMO requires a high output to expand a coverage. However, electric power consumption and heat generation, which are caused by the high output, have a negative effect on reductions in weight and size.

In particular, to install the MIMO antenna, in which modules including RF elements and digital elements are coupled in a layered structure, in a limited space, there is a need for compact and miniaturized design of a plurality of layers constituting the MIMO antenna in order to maximize ease of installation or spatial utilization. Further, there is a strong need for free adjustment of directions of an antenna device installed on a single support pole.

FIG. 1 is a perspective view illustrating a state in which a clamping apparatus for an antenna device in the related art is used, and FIG. 2 is a top plan view illustrating an expansion of an installation space occupied by antenna devices in FIG. 1 before and after the antenna devices are tilted.

As illustrated in FIG. 1, a plurality of antenna devices A1, A2, and A3 may be installed on a single support pole 10. To this end, the support pole 10 has an installation bracket 20, and the antenna devices A1, A2, and A3 are coupled to a tip 20' of the installation bracket 20 by means of a coupling unit 30 and a tilting unit 40.

In this case, as illustrated in FIG. 2, the plurality of antenna devices A1, A2, and A3 is provided to rotate (tilt) in an upward/downward direction about a tilting rotation point T at least by the tilting unit 40. When the plurality of antenna devices A1, A2, and A3 tilts at a maximum angle, the installation space occupied by the antenna devices A1, A2, and A3 is expanded (see reference numerals D1 and D2).

As described above, in the case of the clamping apparatus 1 for an antenna device in the related art, the antenna devices need to be installed in a limited space, e.g., installed intensively on the single support pole 10. For this reason, as the volume occupied by the single antenna increases, the costs required to be provided to an installation space provider increase. As described above, there is a problem in that costs further increase as the space, which is expanded when the antenna device tilts at a maximum angle, increases.

The tilting angles of the antenna devices A1, A2, and A3 need to be ensured to prevent the antenna devices A1, A2, and A3 from affecting or being affected by the radiation of signal beams from peripheral antenna devices A1, A2, and A3. To this end, the antenna devices A1, A2, and A3 need to be installed on the support pole 10 while protruding from the support pole 10 so that the antenna devices A1, A2, and A3 are not caught by the support pole 10 when the antenna devices A1, A2, and A3 are tilted. For this reason, additional rental increases by the installation space occupied by the antenna devices A1, A2, and A3.

For reference, in Korea, because protruding distances of the antenna devices A1, A2, and A3 are different from one another, a minimum interval between the antenna devices A1, A2, and A3 is regulated to be 50 cm to minimize the effect of mutual beamforming radiation.

Further, there may also be a problem in that the tilting angles of the antenna devices A1, A2, and A3 are restricted by physical interference with the support pole 10.

DISCLOSURE

Technical Problem

The present invention has been made in an effort to solve the above-mentioned problem, and an object of the present invention is to provide a clamping apparatus for an antenna device, which is capable of reducing a space occupied by an antenna device when the antenna device tilts, preventing an increase in costs caused by a lease of an installation space, and easily implementing tilting of the antenna device.

Another object of the present invention is to provide a clamping apparatus for an antenna device, which is capable of being flexibly applied to countries for installation where there are regulations related to an installation space for an antenna device and a size of the antenna device to be installed.

Still another object of the present invention is to provide a clamping apparatus for an antenna device, which is capable of reducing an overall installation radius for an antenna device, reducing a moment load to be applied to a support pole, and improving stability of the support pole.

The technical problems of the present invention are not limited to the aforementioned technical problem, and other technical problems, which are not mentioned above, may be clearly understood by those skilled in the art from the following descriptions.

Technical Solution

A clamping apparatus for an antenna device according to the present invention includes a rotation unit, a tilting unit, and a connection arm. The rotation unit may rotate an antenna device in a horizontal direction. The tilting unit may rotate the antenna device in a vertical direction. The connection arm may be configured to install at least one of the rotation unit and the tilting unit on a support pole so that the support pole is not positioned on a horizontal rotation path and a vertical rotation path of the antenna device.

The connection arm may include an arm body and an arm branch. The arm body may be coupled to the support pole. The arm branch may extend straight in a radial direction of the support pole from an outer side of the arm body. At least one of the rotation unit and the tilting unit may be installed on the arm branch.

The connection arm may be configured to install at least one of the rotation unit and the tilting unit on the support pole so that one side of the arm branch is disposed to face a rear surface of the antenna device.

A through-hole may be formed in the arm body, and the support pole may penetrate the through-hole.

The arm branch may be formed in a plate shape. A plate-shaped protrusion may be formed at the other end of the arm branch positioned opposite to the antenna device. The plate-shaped protrusion may be a plate-shaped protrusion for ensuring an installation surface of at least one of the rotation unit and the tilting unit.

A lower surface of the plate-shaped protrusion may extend horizontally from a lower surface of the arm branch. An upper surface of the plate-shaped protrusion may be formed as an inclined surface inclined downward as the distance from the other side of the arm branch increases.

The arm branch may be provided as a plurality of arm branches disposed to be spaced apart from one another at equal intervals in a circumferential direction of the arm body. The antenna device may be provided as a plurality of antenna devices respectively installed on the plurality of arm branches by means of the rotation units and the tilting units.

Among the plurality of arm branches, the rotation unit and the tilting unit installed on any one arm branch and the rotation unit and the tilting unit installed on another arm branch may be provided so as not to come into contact with one another within a maximum rotating range and a maximum tilting range of the plurality of antenna devices.

The rotation unit and the tilting unit may be integrated into a single housing. The connection arm may be configured to install the housing on the support pole.

A rotation center axis of the tilting unit may be positioned within an immediately lower range corresponding to a portion between one side of the arm branch close to the antenna device and the other side positioned opposite to the antenna device, and the rotation center axis of the tilting unit may not deviate from the immediately lower range when the antenna device tilts.

The rotation center axis of the tilting unit may be disposed in parallel with a length of the arm branch when a rotating value of the rotation unit and a tilting value of the tilting unit are '0'.

Other detailed matters of the embodiment are included in the detailed description and the drawings.

Advantageous Effects

According to the clamping apparatus for an antenna device according to the embodiment of the present invention, the antenna device is installed on the support pole so that the support pole is not positioned on the horizontal rotation path and the vertical rotation path of the antenna device, such that the antenna device does not interfere with the support pole when the antenna device tilts. Therefore, because a degree to which the antenna device protrudes from the support pole may be reduced when the antenna device is installed on the support pole, the space occupied by the antenna device may be minimized, and an increase in rental for the installation space for the antenna device may be prevented.

The effects of the present invention are not limited to the aforementioned effects, and other effects, which are not mentioned above, will be clearly understood by those skilled in the art from the claims.

DESCRIPTION OF DRAWINGS

FIG. 1 is a perspective view illustrating an example in which a clamping apparatus for an antenna device in the related art is used.

FIG. 2 is a top plan view illustrating an expansion of an installation space occupied by antenna devices in FIG. 1 before and after the antenna devices are tilted.

FIG. 3 is a conceptual view illustrating a comparison in operational effects between a clamping apparatus for an antenna device according to the present invention and the clamping apparatus in the related art.

FIG. 4 is a perspective side view illustrating the clamping apparatus for an antenna device according to the embodiment of the present invention.

FIG. 5 is a front view of FIG. 4.

FIG. 6 is a top plan view of FIG. 4.

FIG. 7 is a perspective view illustrating a clamping apparatus for an antenna device according to another embodiment of the present invention.

FIG. 8 is an exploded perspective view of FIG. 7.

FIG. 9 is a front view of FIG. 7.

FIG. 10 is a top plan view of FIG. 7.

FIG. 11 is a perspective side view of FIG. 7.

FIG. 12 is a perspective view illustrating a state made after antenna devices are tilted among the components in FIG. 7.

FIG. 13 is a top plan view of FIG. 12.

EXPLANATION OF REFERENCE NUMERALS AND SYMBOLS

10: Support pole
200: Connection arm
210: Arm body
215: Through-hole
220: Arm branch
225: Plate-shaped protrusion
300: Rotation unit
400: Tilting unit
A, A1, A2, A3: Antenna device
T: Tilting axis

BEST MODE

Hereinafter, embodiments of a clamping apparatus for an antenna device according to the present invention will be described in detail with reference to the accompanying drawings.

In giving reference numerals to constituent elements of the respective drawings, it should be noted that the same constituent elements will be designated by the same reference numerals, if possible, even though the constituent elements are illustrated in different drawings. Further, in the following description of the embodiments of the present invention, a detailed description of related publicly-known configurations or functions will be omitted when it is determined that the detailed description obscures the understanding of the embodiments of the present invention.

In addition, the terms first, second, A, B, (a), and (b) may be used to describe constituent elements of the embodiments of the present invention. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present application.

FIG. 3 is a conceptual view illustrating a comparison in operational effects between a clamping apparatus for an antenna device according to the present invention and a clamping apparatus in the related art.

As illustrated in FIG. 3, the clamping apparatus for an antenna device according to the present invention includes a connection arm 200 extending horizontally from a center of a support pole 10 by a predetermined distance, rotation units 300 coupled to lower surfaces of tip portions of the connection arm 200 and configured to rotate about any vertical axes in a horizontal direction, and tilting units 400 coupled to tip portions of the rotation units 300, configured to rotate about any horizontal axes in a vertical direction, and having tip portions to which antenna devices A are fixed.

In this case, any vertical axis may mean a rotation center axis of the rotation unit 300, and any horizontal axis may mean a rotation center axis of the tilting unit 400. In addition, the horizontal rotation about any vertical axis may mean a 'rotation'. Throughout the description, the terms 'rotation' and 'rotating' may mean a horizontal rotation or a leftward/rightward rotation. In addition, the vertical rotation about any horizontal axis may mean 'tilting'. Throughout the description, the term 'tilting' may mean a vertical rotation or an upward/downward rotation.

The rotation unit 300 may be a unit including a rotating motor. The antenna device A may be rotated in the horizontal direction by driving power of the rotating motor. In addition, the tilting unit 400 may be a unit including a tilting motor. The antenna device A may be rotated in the vertical direction by driving power of the tilting motor.

The rotation units 300 may be installed on the connection arm 200, and the tilting units 400 may be installed on the antenna devices A. Alternatively, the rotation units 300 may be installed on the antenna devices A, and the tilting units 400 may be installed on the connection arm 200. That is, any one of the rotation unit 300 and the tilting unit 400 may be installed on the connection arm 200, and the other of the rotation unit 300 and the tilting unit 400 may be installed on the antenna device A.

The rotation unit 300 and the tilting unit 400 may be connected to each other. The rotation unit 300 and the tilting unit 400 may connect the antenna device A to the connection arm 200. In the present embodiment, the rotation unit 300 and the tilting unit 400 may be integrated into a single housing. In this case, the housing may connect the antenna device A to the connection arm 200.

In comparison with the related art in which the rotation unit 300 is coupled to an outer side of a tip of the connection arm 200 illustrated in FIG. 3A, the clamping apparatus for an antenna device according to the present invention illustrated in FIG. 3B may ensure a space made by reducing an installation space occupied by the antenna device A based on a reference line before the antenna device A tilts, thereby preventing an increase in rental for the installation space.

FIG. 4 is a perspective side view illustrating the clamping apparatus for an antenna device according to the embodiment of the present invention, FIG. 5 is a front view of FIG. 4, and FIG. 6 is a top plan view of FIG. 4.

More specifically, as illustrated in FIGS. 4 to 6, in the clamping apparatus for an antenna device according to the embodiment of the present invention, the connection arm 200 is provided as a single sector type in which one side of the connection arm 200 protrudes in the horizontal direction from the support pole 10 and extends by a predetermined length.

That is, the connection arm 200 may include an arm body 210 coupled to the support pole 10, and plate-shaped arm branches 220 extending straight in a radial direction of the support pole 10 from outer sides of the arm body 210.

A through-hole 215 may be formed in the arm body 210, and the support pole 10 may penetrate the through-hole 215. In the present embodiment, the arm body 210 and the through-hole 215 are formed in a circular shape. However, the shapes of the arm body 210 and the through-hole 215 are not limited to the circular shape. The arm body 210 and the through-hole 215 may each have a shape corresponding to a cross-sectional shape of the support pole 10 and be formed in a polygonal shape such as a triangular shape or a quadrangular shape.

The connection arm 200 may be configured to install at least one of the rotation unit 300 and the tilting unit 400 on the support pole 10 so that the support pole 10 is not positioned on a horizontal rotation path and a vertical rotation path of the antenna device A. For example, in the present embodiment, in case that the tilting unit 400 is coupled to the antenna device A, the connection arm 200 may be used to install the rotation unit 300 on the support pole so that the support pole 10 is not positioned on the horizontal rotation path and the vertical rotation path of the antenna device A. In addition, in case that the rotation unit 300 is coupled to the antenna device A, the connection arm 200 may be used to install the tilting unit 400 on the support pole 10 so that the support pole 10 is not positioned on the horizontal rotation path and the vertical rotation path of the antenna device A.

Of course, the clamping apparatus for an antenna device according to the embodiment of the present invention may not include the rotation unit 300 and the tilting unit 400. In this case, the antenna device A may be manually installed on the connection arm 200 by an operator so as to be rotatable and tiltable. The connection arm 200 may be used to install the antenna device A on the support pole 10 so that the support pole 10 is not positioned on the horizontal rotation path and the vertical rotation path of the antenna device A.

Because the antenna device A is installed on the support pole 10 so that the support pole 10 is not positioned on the horizontal rotation path and the vertical rotation path of the antenna device A, the antenna device A does not interfere with the support pole 10 when the antenna device A tilts. Therefore, because a degree to which the antenna device A protrudes from the support pole 10 may be reduced when the antenna device A is installed on the support pole 10, a space occupied by the antenna device A may be minimized, and an increase in rental for the installation space for the antenna device A may be prevented.

As illustrated in FIGS. 4 and 6, a tilting axis T, which is the rotation center axis of the tilting unit 400, may be positioned within an immediately lower range corresponding to a portion between one side 200A of the arm branch 220 close to the antenna device A and the other side 200B positioned opposite to the antenna device A. The tilting axis T of the tilting unit 400 may not deviate from the immediately lower range when the antenna device A tilts.

The connection arm 200 may be used to install at least one of the rotation unit 300 and the tilting unit 400 on the support pole 10 so that one side 200A of the arm branch 220 is disposed to face a rear surface of the antenna device A.

The tilting axis T, which is the rotation center axis of the tilting unit 400, may be disposed in parallel with a length of the arm branch 220 of the connection arm 200 when a rotating value of the rotation unit 300 and a tilting value of the tilting unit 400 are ‘0’.

Therefore, as illustrated in FIG. 5, when the antenna device A clamped by the clamping apparatus for an antenna device according to the embodiment of the present invention is observed from the front side, the support pole 10 at least provided vertically in the upward/downward direction at one side of the antenna device A may be observed.

Further, as illustrated in FIG. 6, because the tilting axis T of the tilting unit 400 is positioned at ordinary times within the immediately lower range of the connection arm 200, it is possible to implement an effect of reducing a tilting space, which is occupied by the antenna device A when the antenna device A tilts in the upward/downward direction, by an extension length of the connection arm 200 in comparison with a comparative example illustrated in FIG. 3A.

At least one of the rotation unit 300 and the tilting unit 400 may be installed at an end of the arm branch 220 of the connection arm 200. A plate-shaped protrusion 225 for ensuring the installation surface of at least one of the rotation unit 300 and the tilting unit 400 may be formed at an end of the other side 200B of the arm branch 220 of the connection arm 200. That is, the plate-shaped protrusion 225 may be formed at the end of the other side 200B of the arm branch 220 positioned opposite to the antenna device A.

A lower surface of the plate-shaped protrusion 225 extends horizontally from a lower surface of the arm branch 220. An upper surface of the plate-shaped protrusion 225 is formed as an inclined surface inclined downward as the distance from the other side 200B of the arm branch 220 increases. Therefore, it is possible to ensure the installation surface for at least one of the rotation unit 300 and the tilting unit 400 while maintaining a minimum weight.

FIG. 7 is a perspective view illustrating a clamping apparatus for an antenna device according to another embodiment of the present invention, FIG. 8 is an exploded perspective view of FIG. 7, FIG. 9 is a front view of FIG. 7, FIG. 10 is a top plan view of FIG. 7, FIG. 11 is a perspective side view of FIG. 7, FIG. 12 is a perspective view illustrating a state made after antenna devices are tilted among the components in FIG. 7, and FIG. 13 is a top plan view of FIG. 12.

As illustrated in FIGS. 7 to 13, in the clamping apparatus for an antenna device according to another embodiment of the present invention, the three arm branches 220 of the connection arm 200 extend horizontally by a predetermined distance from the center of the support pole while having radiation angles of 120 degrees. The antenna devices A1, A2, and A3 may be respectively connected to the three arm branches 220 by means of the rotation units 300 and the tilting units 400.

That is, the arm branches 220 of the connection arm 200 may be provided as a plurality of arm branches 220 disposed to be spaced apart from one another at equal intervals in a circumferential direction of the arm body 210. The antenna devices A1, A2, and A3 may be provided as a plurality of antenna devices A1, A2, and A3 respectively installed on the plurality of arm branches 220 by means of the rotation units 300 and the tilting units 400.

In this case, the rotation units 300 and the tilting units 400, which are respectively installed on the plurality of arm branches 220, may be provided so as not to come into contact with one another within a maximum rotating range and a maximum tilting range of the plurality of antenna devices A1, A2, and A3. That is, among the plurality of arm branches 220, the rotation unit 300 and the tilting unit 400 installed on any one arm branch 220 and the rotation unit 300 and the tilting unit 400 installed on another arm branch 220 may be provided so as not to come into contact with one another within the maximum rotating range and the maximum tilting range of the plurality of antenna devices A1, A2, and A3.

In this case, with reference to FIG. 10, the installation space, which is occupied by the antenna devices A1, A2, and A3 before the antenna devices A1, A2, and A3 are tilted, is reduced to a range D1. With reference to FIG. 13, the installation space is limited to a range D2 even when the antenna devices A1, A2, and A3 are tilted downward at 20 degrees. Therefore, it is possible to ensure the installation space within a very small range in comparison with the comparative example illustrated in FIG. 3A.

As described above, according to the embodiments of the clamping apparatus for an antenna device according to the present invention, it is possible to reduce the overall installation radius for the antenna devices A (A1, A2, and A3), thereby reducing a moment load applied to the support pole 10 and improving the stability of the support pole 10.

The embodiments of the clamping apparatus for an antenna device according to the present invention have been described in detail above with reference to the accompanying drawings. However, the present invention is not necessarily limited by the embodiments, and various modifications of the embodiments and any other embodiments equivalent thereto may of course be carried out by those skilled in the art to which the present invention pertains. Accordingly, the true protection scope of the present invention should be determined by the appended claims.

INDUSTRIAL APPLICABILITY

The present invention provides the clamping apparatus for an antenna device, which is capable of reducing the space occupied by the antenna device when the antenna device tilts, preventing an increase in costs caused by a lease of the installation space, and easily implementing tilting of the antenna device.

The invention claimed is:

1. A clamping apparatus for an antenna device, the clamping apparatus comprising:

a rotation unit configured to rotate an antenna device in a horizontal direction;

a tilting unit configured to rotate the antenna device in a vertical direction; and a connection arm configured to rotatably connect at least one of the rotation unit and the tilting unit to a support pole so that the support pole is not positioned on a horizontal rotation path and a vertical rotation path of the antenna device, wherein the connection arm comprises:

an arm body coupled to the support pole; and an arm branch extending straight in a radial direction of the support pole from an outer side of the arm body, at least one of the rotation unit and the tilting unit being installed on the arm branch, and wherein a rotation center axis of the tilting unit is positioned within an immediately lower range corresponding to a portion between one side of the arm branch close to the antenna device and the other side positioned opposite to the antenna device, and the rotation center axis of the tilting unit does not deviate from the immediately lower range when the antenna device tilts.

2. The clamping apparatus of claim 1, wherein the connection arm is configured to rotatably connect at least one of the rotation unit and the tilting unit on the support pole so that one side of the arm branch is disposed to face a rear surface of the antenna device.

3. The clamping apparatus of claim 1, wherein a through-hole is formed in the arm body, and the support pole penetrates the through-hole.

4. The clamping apparatus of claim 1, wherein the arm branch is provided as a plurality of arm branches disposed to be spaced apart from one another at equal intervals in a circumferential direction of the arm body, and the antenna device is provided as a plurality of antenna devices respectively installed on the plurality of arm branches by means of the rotation units and the tilting units.

5. The clamping apparatus of claim 4, wherein among the plurality of arm branches, the rotation unit and the tilting unit installed on any one arm branch and the rotation unit and the tilting unit installed on another arm branch are provided so as not to come into contact with one another within a maximum rotating range and a maximum tilting range of the plurality of antenna devices.

6. The clamping apparatus of claim 1, wherein the rotation unit and the tilting unit are integrated into a single housing, and the connection arm is configured to install the housing on the support pole.

7. The clamping apparatus of claim 1, wherein the rotation center axis of the tilting unit is disposed in parallel with a length of the arm branch when a rotating value of the rotation unit and a tilting value of the tilting unit are '0'.

8. A clamping apparatus for an antenna device, the clamping apparatus comprising:

a rotation unit configured to rotate an antenna device in a horizontal direction;

a tilting unit configured to rotate the antenna device in a vertical direction; and a connection arm configured to install at least one of the rotation unit and the tilting unit on a support pole so that the support pole is not positioned on a horizontal rotation path and a vertical rotation path of the antenna device, wherein the connection arm comprises:

an arm body coupled to the support pole; and an arm branch extending straight in a radial direction of the support pole from an outer side of the arm body, at least one of the rotation unit and the tilting unit being installed on the arm branch, wherein the arm branch is formed in a plate shape, and a plate-shaped protrusion for ensuring an installation surface of at least one of the rotation unit and the tilting unit is formed at the other end of the arm branch positioned opposite to the antenna device.

9. The clamping apparatus of claim 8, wherein a lower surface of the plate-shaped protrusion extends horizontally from a lower surface of the arm branch, and an upper surface of the plate-shaped protrusion is formed as an inclined surface inclined downward as the distance from the other side of the arm branch increases.

* * * * *